(12) United States Patent
Ahn et al.

(10) Patent No.: US 11,620,044 B2
(45) Date of Patent: Apr. 4, 2023

(54) MOBILE TERMINAL

(71) Applicant: LG ELECTRONICS INC., Seoul (KR)

(72) Inventors: Yehan Ahn, Seoul (KR); Minho Kim, Seoul (KR); Hoyoung Kim, Seoul (KR); Dongju Lee, Seoul (KR); Jihye Yu, Seoul (KR); Jieun Lee, Seoul (KR); Dongchul Jin, Seoul (KR); Minwoo Song, Seoul (KR); Sangkuk Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 16/661,199

(22) Filed: Oct. 23, 2019

(65) Prior Publication Data
US 2020/0125252 A1 Apr. 23, 2020

Related U.S. Application Data

(60) Provisional application No. 62/807,251, filed on Feb. 19, 2019.

(30) Foreign Application Priority Data

| Oct. 23, 2018 | (WO) | PCT/KR2018/012562 |
| Feb. 13, 2019 | (WO) | PCT/KR2019/001775 |
| Jul. 30, 2019 | (KR) | 10-2019-0092154 |

(51) Int. Cl.
*G06F 3/0488* (2022.01)
*H04M 1/02* (2006.01)
*G06F 9/451* (2018.01)
*G06F 3/04883* (2022.01)

(52) U.S. Cl.
CPC .......... *G06F 3/04883* (2013.01); *G06F 9/451* (2018.02); *H04M 1/0202* (2013.01); *H04M 2250/12* (2013.01)

(58) Field of Classification Search
CPC .. G06F 3/04895; G06F 9/453; G06F 3/04883; G06F 9/451; H04N 1/00477; H04M 1/0202; H04M 2250/12; H04M 1/72403; H04M 2250/52
See application file for complete search history.

(56) References Cited

U.S. PATENT DOCUMENTS

| 11,301,124 B2* | 4/2022 | Baer | G06F 3/1423 |
| 2006/0097991 A1* | 5/2006 | Hotelling | G06F 3/0446 |
| | | | 345/173 |

(Continued)

FOREIGN PATENT DOCUMENTS

| KR | 10-2013-0100524 A | 9/2013 |
| KR | 10-2014-0035244 A | 3/2014 |

(Continued)

*Primary Examiner* — Jennifer N Welch
*Assistant Examiner* — Parmanand D Patel
(74) *Attorney, Agent, or Firm* — Birch, Stewart, Kolasch & Birch, LLP

(57) ABSTRACT

A mobile terminal including a display; a Time of Flight (TOF) camera configured to obtain a depth image of an object; and a controller configured to display a guide interface on the display to guide the object to move into an interaction region of an imaging region of the TOF camera.

13 Claims, 20 Drawing Sheets

(56) References Cited

U.S. PATENT DOCUMENTS

| | | | |
|---|---|---|---|
| 2008/0168403 A1* | 7/2008 | Westerman | G06F 3/041 |
| | | | 715/863 |
| 2009/0051660 A1* | 2/2009 | Feland, III | G06F 3/04883 |
| | | | 345/173 |
| 2009/0167679 A1* | 7/2009 | Klier | G06F 3/011 |
| | | | 345/157 |
| 2010/0265175 A1* | 10/2010 | Kabasawa | G06F 3/0481 |
| | | | 345/159 |
| 2013/0179781 A1* | 7/2013 | Nan | G06F 3/04842 |
| | | | 715/711 |
| 2015/0160807 A1* | 6/2015 | Vakharia | G06Q 30/0627 |
| | | | 705/26.63 |
| 2015/0324001 A1* | 11/2015 | Yanai | G06T 7/70 |
| | | | 345/156 |
| 2016/0054858 A1* | 2/2016 | Cronholm | G06F 3/017 |
| | | | 345/175 |
| 2017/0090584 A1 | 3/2017 | Tang et al. | |
| 2017/0244922 A1 | 8/2017 | Dielacher et al. | |
| 2017/0272651 A1 | 9/2017 | Mathy et al. | |
| 2017/0324891 A1 | 11/2017 | Mark et al. | |
| 2020/0117336 A1* | 4/2020 | Mani | G06F 3/0304 |

FOREIGN PATENT DOCUMENTS

| | | | |
|---|---|---|---|
| KR | 10-2015-0022673 A | | 3/2015 |
| KR | 10-1660215 B1 | | 9/2016 |
| KR | 10-1760804 B1 | | 7/2017 |
| KR | 10-1861393 B1 | | 5/2018 |
| WO | 2014168558 | * | 10/2014 |
| WO | WO 2018/026142 A1 | | 2/2018 |

* cited by examiner

FIG. 7
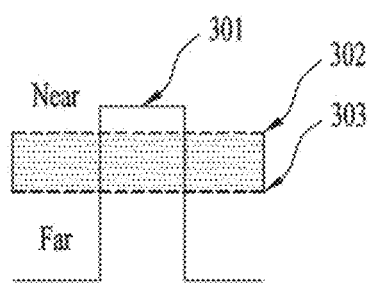
(a)
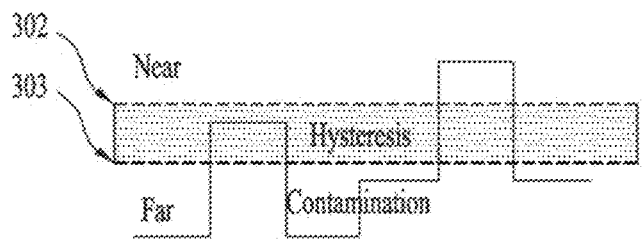
(b)
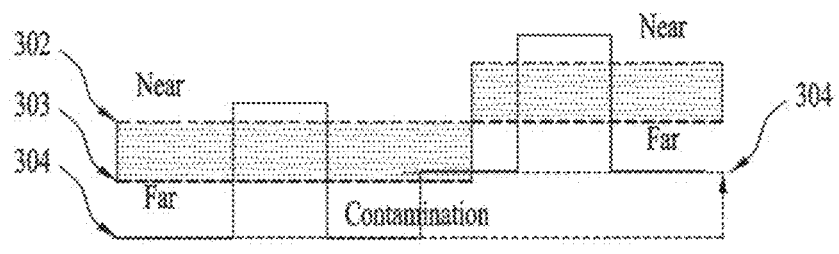
(c)

FIG. 13
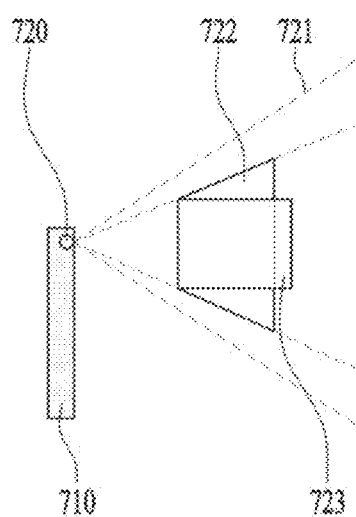
(a)
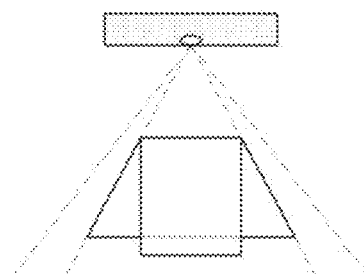
(b)
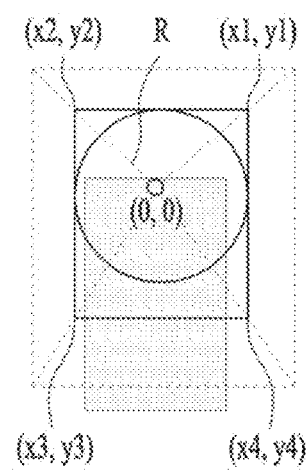
(c)

(a)            (b)

FIG. 19
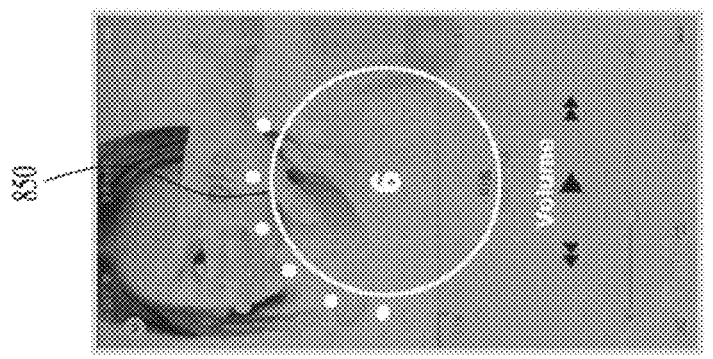
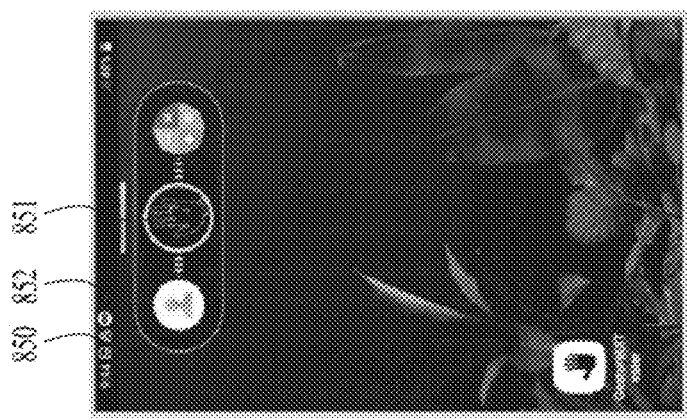
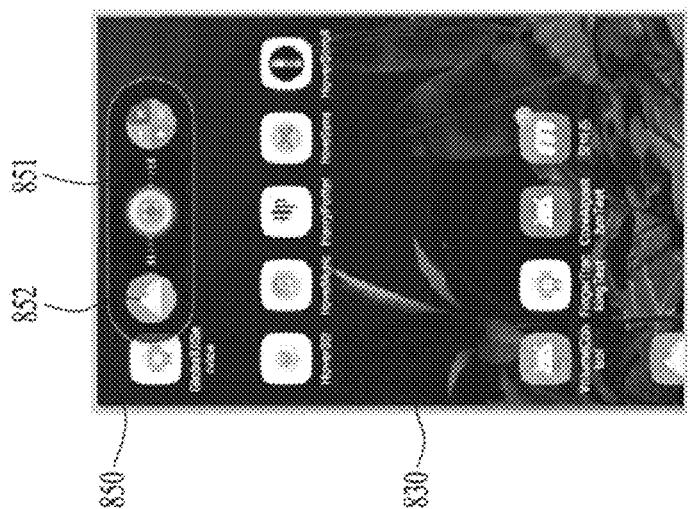

MOBILE TERMINAL

CROSS-REFERENCE TO RELATED APPLICATIONS

Pursuant to 35 U.S.C. § 119(a), this application claims the benefit of an earlier filing date and priority to Korean Application No. 10-2019-0092154 filed in the Republic of Korea on Jul. 30, 2019, and claims the priority benefit under 35 U.S.C. § 119(e) to U.S. Provisional Application No. 62/807,251 filed on Feb. 19, 2019, and under 35 U.S.C. § 119(a) to PCT Application Nos. PCT/KR2019/001775 filed on Feb. 13, 2019 and PCT/KR2018/012562 filed on Oct. 23, 2018, all of which are hereby expressly incorporated by reference into the present application.

BACKGROUND OF THE INVENTION

Field of the Invention

The present disclosure relates to a mobile terminal. More specifically, the present disclosure is applied to a technical field where an input signal is input using a user's hand motion without a direct touch.

Discussion of the Related Art

Terminals may be divided into mobile terminals or portable terminals and fixed terminals or stationary terminals, depending on their mobility. Mobile terminals may be categorized into portable terminals or handheld terminals and vehicle mounted terminals depending on the user's direct portability.

The functions of mobile terminals are diversifying. For example, the functions may include data and voice communication, imaging and video shooting through camera, voice recording, music file playback through speaker system, and outputting of an image or video on the display. Some terminals have added electronic game play functions or further perform multimedia player functions. In particular, modern mobile terminals can receive multicast signals that provide visual content such as broadcast, video, and television programs.

With development of three-dimensional depth camera technology, the mobile terminal has a user interface (UI) that detects the motion or gesture of the user based on the three-dimensional vision technology to control the mobile terminal. The three-dimensional vision-based UI can complement existing two-dimensional touch-based UI and be applied to various applications. For example, in Augmented Reality (AR) applications, the three-dimensional vision-based UI can control objects in a three dimension. Even when the device is in a position where the user cannot touch the device, the three-dimensional vision-based UI allows the user to control the device. When the user's hand is dirty or wearing gloves to disable the touch control, the three-dimensional vision-based UI allows the user to control the device. Accordingly, the three-dimensional vision-based gesture recognition technology is in the spotlight.

SUMMARY OF THE INVENTION

One object of the present disclosure is to provides a UI which provides an input signal using the user's hand motion without a direct touch, and guides the user's hand to a specific region so that the user's hand motion can be easily recognized.

A first aspect of the present disclosure provides a mobile terminal including a display for providing visual content; a Time of Flight (TOF) camera to image an object to obtain a depth image; and a controller connected to the display and the TOF camera, wherein the controller is configured to control the display to provide a guide interface that guides a specific object into an interaction region of an imaging region of the TOF camera.

Effects of the present disclosure are as follows but are not limited thereto. According to at least one of embodiments according to the present disclosure, the guide interface guides the user's hand toward the specific region and, when the user's hand is positioned in a specific region, the input signal is input using the user's hand motion. Thus, the mobile terminal can be controlled using an input signal input using the user's hand motion without a direct touch.

In addition to the effects as described above, specific effects of the present disclosure are described together with specific details for carrying out the present disclosure.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 7 illustrates a diagram illustrating a need for resetting the baseline of a proximity sensor, according to one embodiment of the present disclosure.

FIG. 13 illustrates an interaction region according to an embodiment of the present disclosure.

FIG. 19 illustrates a graphical interface provided when the user's hand is positioned in an interaction region, according to one embodiment of the present disclosure.

DETAILED DESCRIPTION OF THE EMBODIMENTS

Figure 1A:
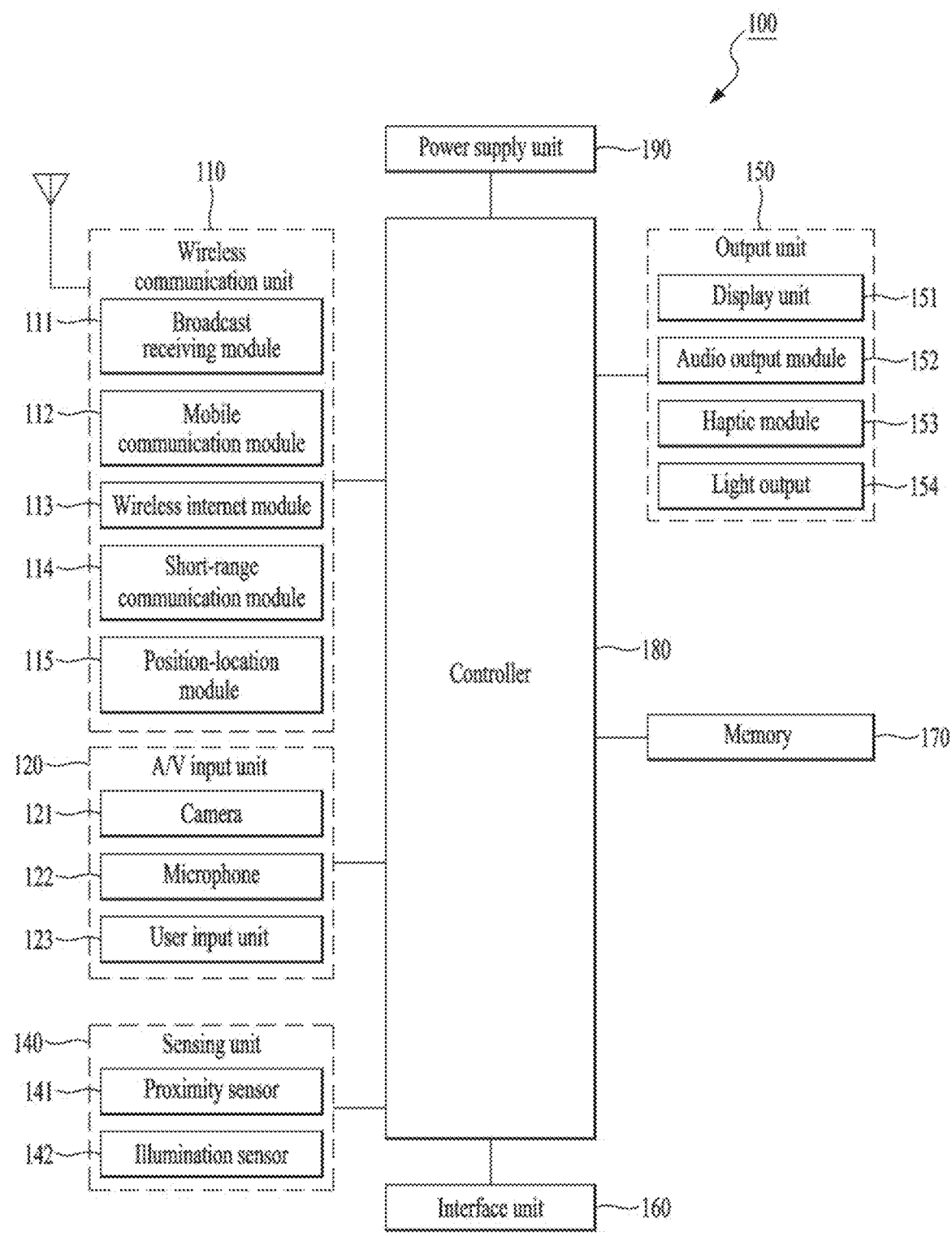
FIG. 1a is a block diagram illustrating a mobile terminal in accordance with the present disclosure.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, a suffix such as "module" and "unit" may be used to refer to elements or components. Use of such a suffix herein is merely intended to facilitate description of the specification, and the suffix itself is not intended to give any special meaning or function.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
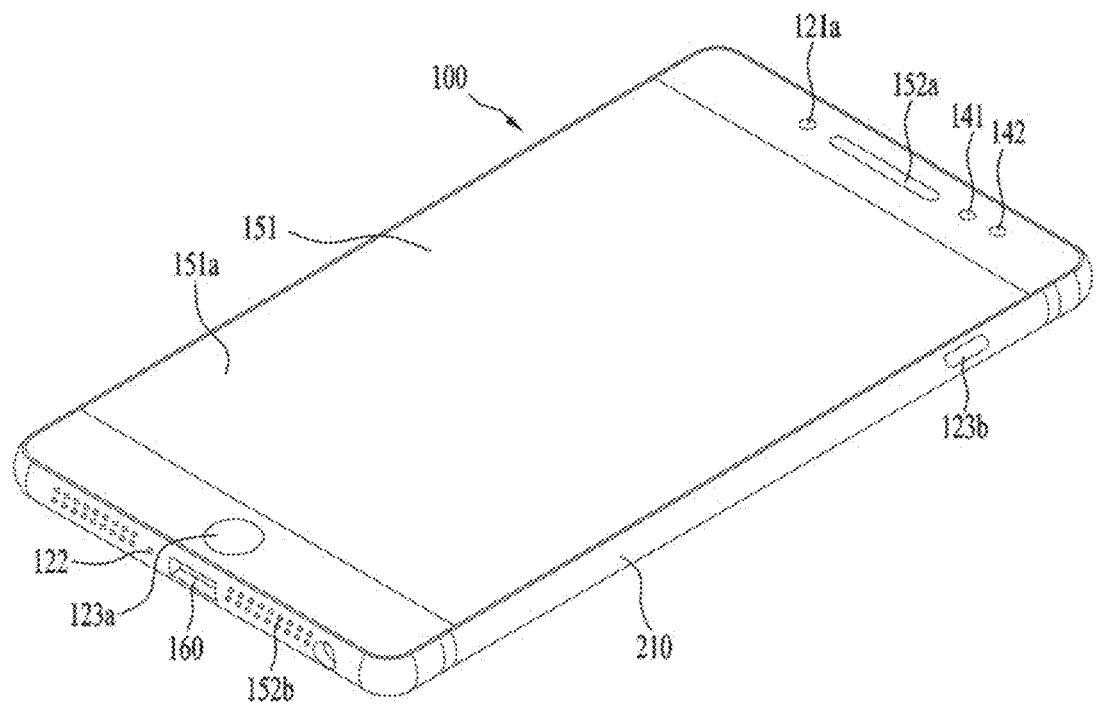
FIG. 1b and FIG. 1c are conceptual views of examples of mobile terminals in accordance with the present disclosure when viewed in different directions.
Figure 1C:
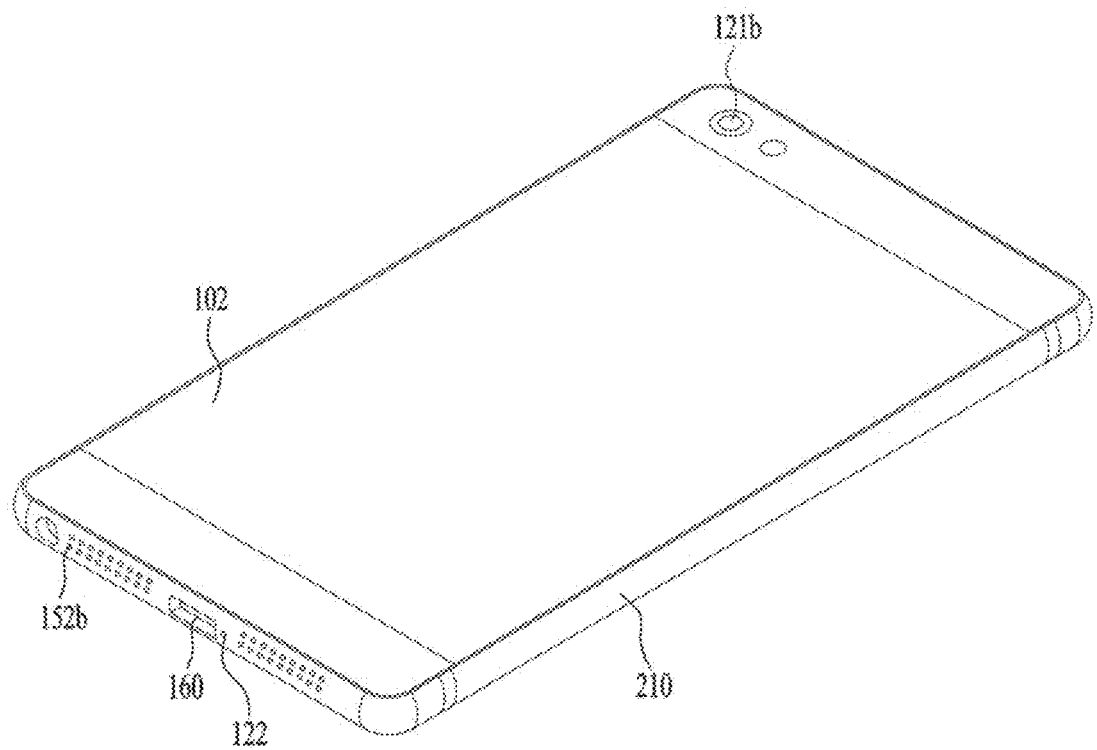

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in FIG. 1a is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position-location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical (light) output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1a. Moreover, the controller 180 can be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

FIG. 1b and FIG. 1c illustrate basic features of a mobile terminal in a foldable scheme in an expanded state. The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1b and 1c. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has identified a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1a). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

The cameras applied to the present disclosure (camera 121 shown in FIG. 1 and camera 121a shown in FIG. 2(a)) are positioned around the touch screen of the mobile device. Thus, the cameras may detect depth information about an object (e.g., the user's finger) within a predefined distance from the touch screen of the mobile device. Such a camera may be named a depth camera.

The present disclosure provides two approaches to implement the depth camera. A first approach is to use multiple cameras or lenses to capture visible light using two or more cameras and to use depth information to creates a 3D image. A second approach is a scheme to mount a separate sensor for depth sensing in a camera module. More specifically, in this second approach, the SL (Structured Light) and ToF (Time of Flight) schemes may be employed.

In the above-described SL scheme, after a laser of a specific pattern such as a straight line or a lattice pattern is emitted to an imaging target, pattern modification according to a shape of the target surface may be analyzed. Furthermore, the depth information is calculated and then synthesized with a photograph taken by the image sensor to derive a 3D-based imaging result. In order to implement this scheme, a laser infrared (IR) projector that emits a laser of a specific pattern, an infrared depth sensor, an image sensor, a 3D processor, and the like may be used.

The ToF scheme described above calculates depth information by measuring a time duration for which the laser emits toward the imaging target and then reflects therefrom and returns to an initial emission position. Then, the 3D-based imaging result may be obtained by combining an image taken by the image sensor and depth information with each other. To implement this scheme, a laser infrared (IR) projector, a reception sensor, an image sensor, and a 3D processor may be used.

Figure 2:
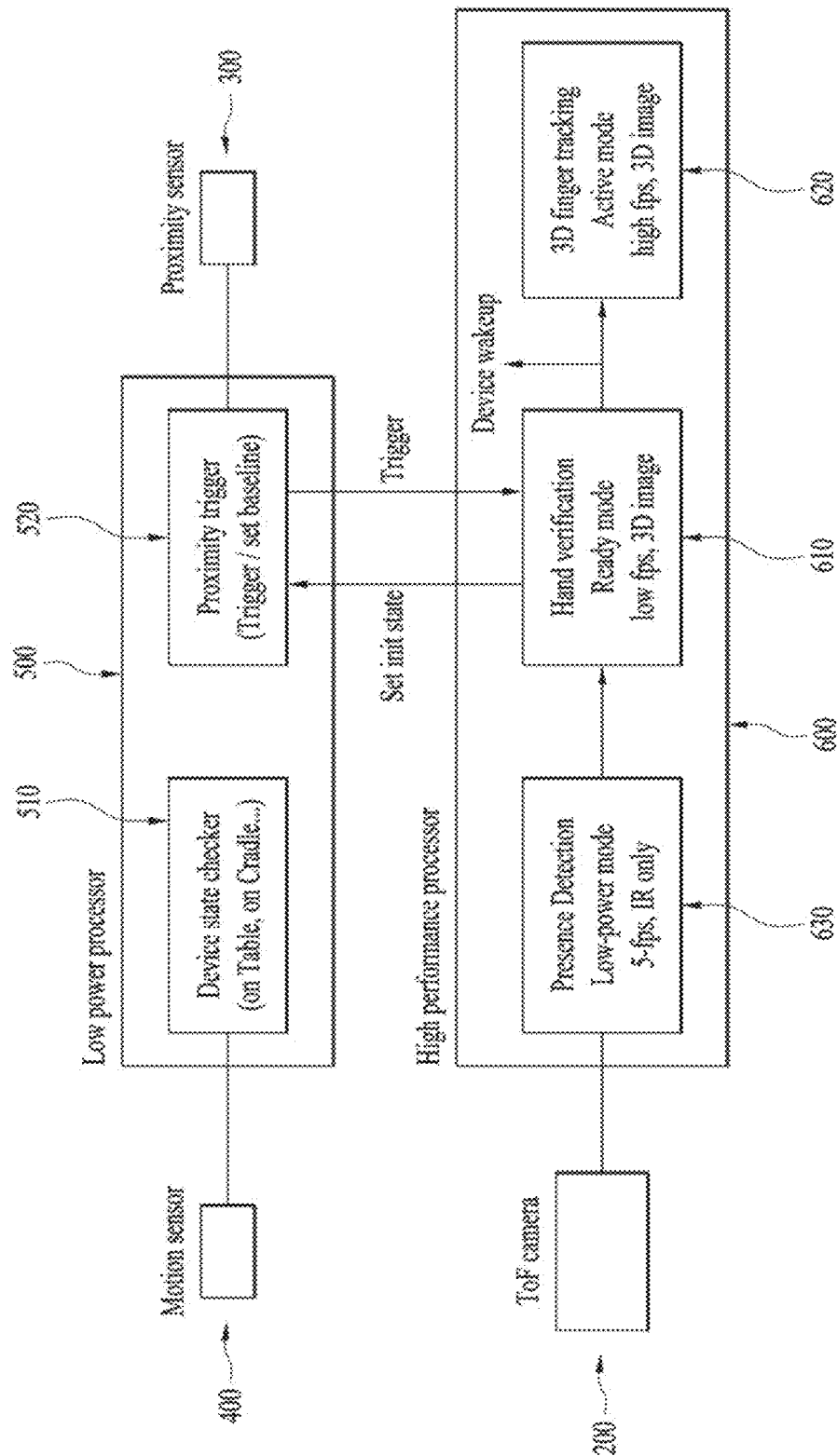
FIG. 2 is a schematic diagram of a mobile terminal for performing a 3-dimensional vision based UI based on a depth camera and a proximity sensor, according to an embodiment of the present disclosure.

Next, FIG. 2 is a diagram illustrating a mobile terminal for performing a 3-dimensional vision based UI based on a depth camera and a proximity sensor according to an embodiment of the present disclosure. The present disclosure provides a system that can detect the user's hand using a three-dimensional depth camera 200 and a proximity sensor 300 and activate or deactivate the device accordingly.

The device according to the present disclosure includes a mobile terminal, but is not limited thereto. For example, the device according to the present disclosure may include televisions, artificial intelligence devices, tablets, etc. that may utilize the 3-dimensional vision based UI.

In addition, the depth camera 200 according to the present disclosure may include a TOF (time-of-flight) camera, but is not necessarily limited thereto. The proximity sensor 300 according to the present disclosure can emit light and then determine proximity using light intensity of reflected light, but is not necessarily limited thereto. The scheme by which the proximity sensor 300 determines the proximity of an object is discussed in detail in FIG. 7.

In accordance with the present disclosure, when an object is detected as proximal to the device using the proximity sensor 300, the device can use the depth camera 200 to acquire a depth image and identify whether the object in the acquired depth image corresponds to the user's hand.

The device can additionally include a motion sensor 400 that can detect the state of the device. That is, the motion sensor 400 can detect whether the device exists in a state suitable for the device to perform the 3D-based UI. For example, when the device is present on a table or fixed thereto toward the user, the motion sensor 400 can determine that the user is in a stable state suitable for performing the 3D-based UI with the device.

For this purpose, the motion sensor 400 may include an acceleration sensor and a gyro sensor. The motion sensor 400 can serve as a trigger for activating the proximity sensor 300. In other words, only when it is determined using the motion sensor 400 that the device is stable, the device can obtain data to determine the proximity of an object using the proximity sensor 300.

However, when the device such as a television is stationary, the motion sensor 400 may not be needed. In this instance, the proximity sensor 300 may always be in an active state. In more detail, the motion sensor 400 and the proximal sensor 300 can be controlled by a low power processor 500 that operates at low power.

The low power processor 500 may include a device state checker 510 which is connected to the motion sensor 400 to detect the motion state of the device using the data acquired by the motion sensor 400. When the device state checker 510 detects that the motion of the device has a stable state to perform a 3-dimensional vision based UI with the user, a proximity trigger 520 may be used to activate the proximity sensor 300 to obtain data to determine object proximity.

The proximity trigger 520 sets a baseline using the data obtained using proximity sensor 300. The baseline may be used to determine the proximity of an object. When the proximity trigger 520 is used to detect that an object is in a proximal state to the device, the processor may activate the depth camera 300. The depth camera 300 is connected to a high performance processor 600. The high-performance processor 600 may control the depth camera 300 to obtain a depth image and may track a user's index finger to perform a 3-dimensional vision based UI.

Specifically, the high-performance processor 600 may include an object identifying module 610 for controlling the depth camera 300 to obtain the depth image from the depth camera 300 and then identifying whether an object corresponds to the user's hand based on the acquired depth image.

The depth camera 300 can acquire a depth image in a ready mode. The object identifying module 610 can identify a shape of the depth image. In addition, the ready mode can be activated when it is determined using a proximity sensor 300 that the object is proximal to the device.

Also, the object identifying module 610 can identify the object. Based on the identification result, the baseline of the proximity sensor 300 can be updated. This can be performed to prevent the depth camera 300 from unnecessarily operating in an active mode in which the depth camera 300 tracks the index finger of the user hand, which may otherwise occur due to a faulty baseline of the proximity sensor 300 or contamination around the proximity sensor 300. This is discussed in detail in FIG. 7.

When the high-performance processor 600 recognizes the user's hand using the object identifying module 610, the high-performance processor 600 can activate a tracking module 620 to detect the gesture of the user hand or to track the index finger of the user hand. In some cases, the high-performance processor 600 may further include an object detector 630 which acquires a two-dimensional image using a depth camera 200 and detects the presence or absence of an object.

The object detector 630 may be a component that replaces the role of the proximity sensor 300. That is, when the depth camera 200 obtains a two-dimensional image corresponding to the intensity data, the depth camera 200 can be operated in a low power mode under control of the object detector 630.

While operating the depth camera 200 in the low power mode, the detector 630 can detect the presence of an object. In this instance, the object identifying module 610 can be activated to switch a current mode to the ready mode. Since the object detector 630 acts as the proximity sensor 300, the proximity sensor 300 and the proximity trigger 520 are omitted when the device includes the object detector 630. The object detector 630 can be configured to be activated under control of the device state checker 510. Further, the low power processor 500 and the high-performance processor 600 may not be individual based on the computing and processing power, and may be integrated into one controller.

Figure 3:
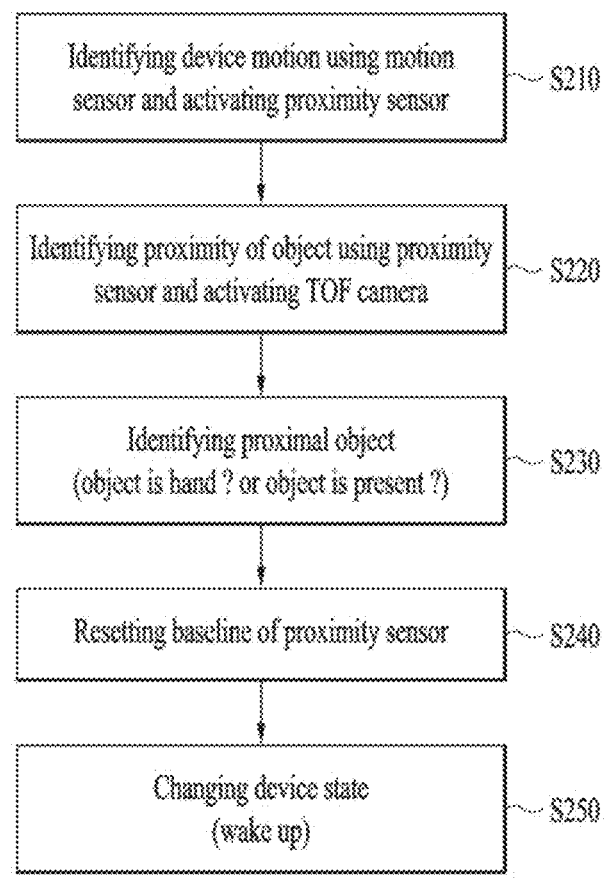
FIG. 3 is a flowchart illustrating a process for performing a 3-dimensional vision based UI according to an embodiment of the present disclosure.

Next, FIG. 3 is a flowchart illustrating a process for performing the 3-dimensional vision based UI according to an embodiment of the present disclosure. In particular, FIG. 3 is a flowchart illustrating a process for performing the 3-dimensional vision based UI based on the system according to the present disclosure shown in FIG. 2.

The processor according to the present disclosure can identify the motion of the device using the data acquired by the motion sensor 400, and activate the proximity sensor 300 when the device is in a state suitable to perform the 3-dimensional vision based UI S210. However, when the device is a stationary device rather than a portable device such as a mobile terminal, the step of identifying the motion of the device using the motion sensor 400 may be omitted. In this instance, the proximity sensor 300 may always be in an active state.

Further, when the depth camera 200 according to the present disclosure obtains a 2D image and when the presence or absence of an object is detected (when=the object detector 630 is present), the object detector 630 can replace the proximity sensor 300. However, hereinafter, the present disclosure will be described based on a processor for identifying whether a proximal object is present or absent using the proximity sensor 300.

When the proximity sensor 300 is activated, the processor can acquire data from the proximity sensor 300 to identify the proximity of the object and to activate the depth camera 300 based on the identifying result S220. In this connection, activating the depth camera 300 means operating the depth camera in a ready mode.

The proximity sensor 300 may use various type of sensors. Typically, the proximity sensor 300 can identify the proximity of the object by detecting the intensity of light reflected from the object. In addition, the proximity sensor 300 detects the light that is reflected back from the object, sets the baseline using an average value and sets a threshold value by adding a predefined value to the set baseline. Once the threshold value is set, the proximity of the object can be identified by comparing the detected light intensity with the threshold value.

The object identifying module 610 can be activated when the depth camera 200 is operated in ready mode and can identify the object by obtaining the depth image from the depth camera 200 S230. The object can be identified using a shape of a depth image and pre-stored database.

In accordance with the present disclosure, the device tracks the user's hand to perform a 3-dimensional vision based UI. Thus, the device can identify whether the object corresponds to a hand or an object other than the hand. In some cases, when the object does not exist, the device can identify this absence.

The baseline of the proximity sensor 300 can be reset based on whether the object corresponds to a hand, an object other than the hand, or when there is no object S240. This is to correct the incorrectly set baseline of the proximity sensor 300 and is to prevent sensing errors due to contamination of an adjacent portion thereto.

The processor resets the baseline of the proximity sensor 300. Then, the object is identified by the depth camera 200 activated based on the reset baseline of the proximity sensor 300. When it is determined that the object corresponds to the user's hand, the state of the device can be changed correspondingly S250. For example, when the device is in a sleep mode, the processor can wake up the device and can track the index finger of the user hand and perform the 3-dimensional vision based UI with the user.

Figure 4:
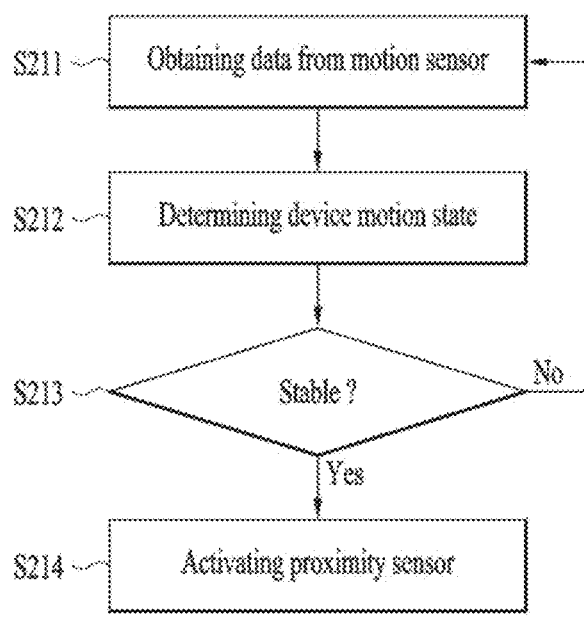
FIG. 4 is a flowchart illustrating a process for selectively activating a proximity sensor using a motion sensor according to one embodiment of the present disclosure.

FIG. 4 is a flow diagram illustrating a process that a proximity sensor is selectively activated using a motion sensor according to one embodiment of the present disclosure. In particular, FIG. 4 is a flowchart illustrating a process for executing the 3-dimensional vision based UI using a motion sensor 400 based on the system according to the present disclosure shown in FIG. 2.

When the device according to the present disclosure is a portable terminal such as a mobile terminal, it may be desirable to activate the proximity sensor 300 based on the detection result from the motion sensor 400 for power consumption prevention and processor stabilization. The motion sensor 400 may include an acceleration sensor, a gyro sensor, a magnetic sensor, and the like. The processor can use the motion sensor to obtain data for determining the motion of the device S211.

Three-axis data can be used to determine the device motion, but in some cases, at least nine axes data can be used. The motion state of the device can be determined using the data obtained at a predefined time interval using the motion sensor 400 S212. The device motion can be determined by comparing data difference between data of a N-th frame and data of a (N−1)-th frame with a predetermined reference value. The processor can use axis movement to identify whether the device is present on a fixed floor, or the device is in a fixed state while facing toward the user.

When the device is in a stable state suitable for tracking the user's hand and thus performing a 3-dimensional vision based UI with the user (S213 and Yes), the proximity sensor 300 can be activated to obtain data to determine the proximity of an object. When the proximity sensor 300 is activated, acquiring the data for detecting the motion of the device can be temporarily stopped.

Further, when the device is not in a state suitable for performing the 3-dimensional vision based UI with the user by tracking the user's hand (S213 and No), there is no need to acquire the depth image. Thus, the proximity sensor 300 can be left in an inactive state and the motion sensor can be used to acquire motion data until the device reaches the stable state for performing the 3-dimensional vision based UI with the user.

Figure 5:
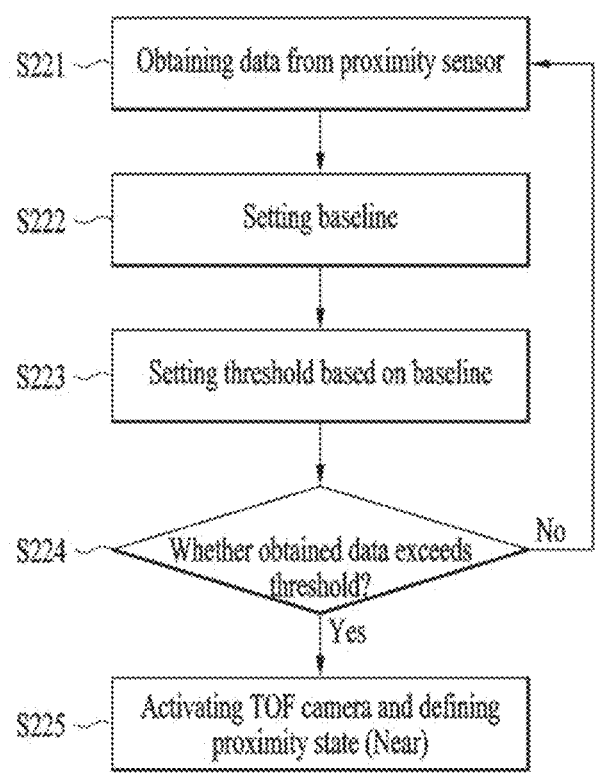
FIG. 5 is a flowchart illustrating a process for setting a threshold value of a proximity sensor, and activating a depth camera based on the setting according to one embodiment of the present disclosure.

FIG. 5 shows a flowchart illustrating a process in which a threshold value of a proximity sensor is set and then a depth camera is activated based on the setting according to one embodiment of the present disclosure. Hereinafter, FIG. 5 will be described based on the system according to the present disclosure disclosed in FIG. 2.

When the proximity sensor 300 is activated, the proximity sensor can irradiate light to an object to determine the proximity of the object and acquire data corresponding to the intensity of the reflected light S221. However, the method by which the proximity sensor 300 determines the proximity of the object is not limited to the scheme of detecting the reflected light.

The proximity sensor 300 can set the baseline by averaging data of predefined frames acquired after the activation thereof S222. In some cases, the processor in accordance with the present disclosure can set a predefined value as a baseline. A threshold value as a reference value for identifying an object's proximity, can be set by adding a predefined value to the baseline S223.

When the data acquired by the proximity sensor 300 is larger than the threshold value, the object can be identified to have a proximal state. On the contrary, when the data acquired by the proximity sensor 300 is smaller than the threshold value, the object can be identified to have a distant state.

When the data obtained by the proximity sensor 300 exceeds the threshold value (S224, Yes), the processor can identify the object as being proximal and activate the depth camera 200 into the ready mode S225. Further, when the data obtained by the proximity sensor 300 does not exceed the threshold value, the processor can use the proximity sensor 300 to acquire proximity data continuously without activating the depth camera 200 (S224, No). In this connection, when the motion of the device is out of the stable state, the processor can disable the proximity sensor 300 and stop the data acquisition.

Figure 6:
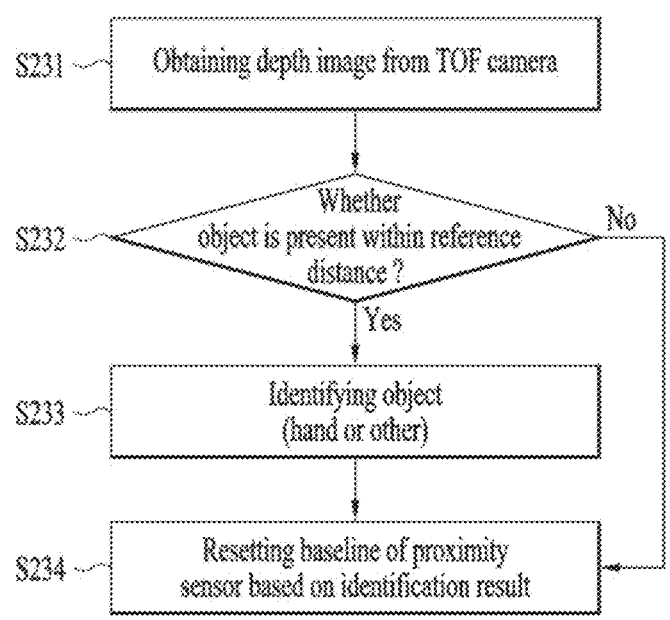
FIG. 6 is a flow diagram illustrating a process for changing a mode for resetting a baseline of a proximity sensor according to an identified object, according to one embodiment of the present disclosure.

FIG. 6 is a flow diagram illustrating a processor that changes a mode for resetting a baseline of a proximity sensor based on an identified object, according to one embodiment of the present disclosure. Hereinafter, FIG. 6 will be described based on FIG. 2.

When the object is determined to be proximal using the proximity data from the proximity sensor 300, the processor can activate the depth camera 200 into the ready mode. In the ready mode, the depth camera 200 acquires a depth image S231. The object identifying module 610 uses the acquired depth image to determine whether an object exists within a predefined distance S232.

When there is no object within the predefined distance (S232, No), the baseline of the proximity sensor 200 can be reset in response to no object S234. The absence of the object within the predefined distance may be because the baseline of the proximity sensor 300 is set too low, or that a contaminant is present near the proximity sensor 300.

When there is an object within the predefined distance (S232, Yes), the object identifying module 610 can identify whether an object is or is not a hand using the pre-stored database S233. The baseline of the proximity sensor can be reset based on whether the object corresponds to the hand or an object other than the hand S234.

FIG. 7 illustrates a diagram illustrating describing a need for resetting a baseline of a proximity sensor, according to one embodiment of the present disclosure. Conventionally, the threshold values 302 and 303 were set to absolute values as shown in FIG. 7a. Then, the proximity of the object was determined by comparing the data 301 obtained using the proximity sensor 200 with the threshold values 302 and 302.

A single threshold value can be set, but two threshold values can be set to identify the proximity more accurately. That is, when the data is higher than the first threshold value 302, the processor can determine that the object is proximal to the device. Then, when the data is lower than the second threshold value 303, it is determined that the object is far away from the device.

However, when the threshold value is absolutely set as shown in FIG. 7B, a following problem may occur: although the data exists between the first threshold value 302 and the second threshold value 303, a resulting overall data value can increase due to the contamination near the proximity sensor 300, thereby incorrectly indicating that the object is proximal to the device.

Thus, to prevent this incorrect indication, the processor can average data of the predefined frames of the proximity sensor 200 and set the average to the baseline 304, as shown in FIG. 7c. When the threshold value is set relatively larger by a predefined value relative to the baseline 304, the processor can identify the proximity of the object without error even when the overall data value increases due to the contamination near the proximity sensor 300. However, the baseline of the proximity sensor 300 can be reset based on the depth image. This will be described below.

Figure 8:
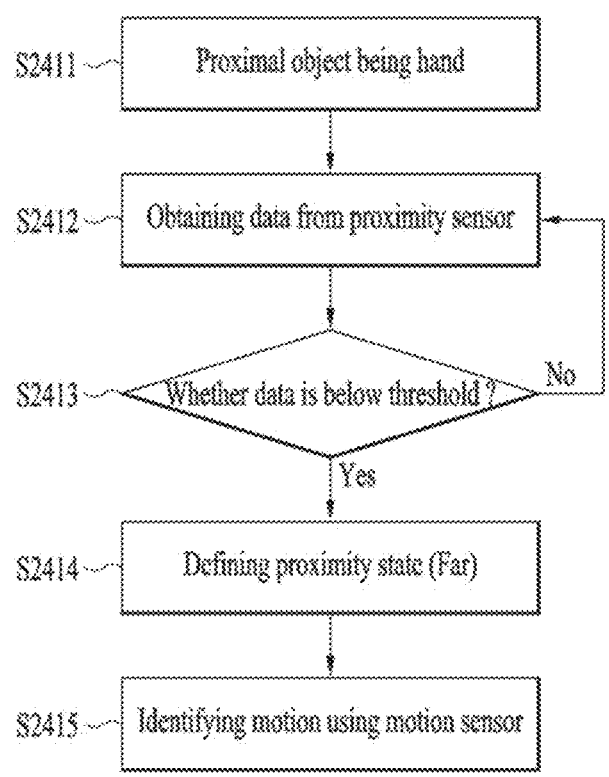
FIG. 8 to FIG. 10 are flowcharts illustrating a process for updating a threshold value of a proximity sensor based on presence or absence of an object or a type of the object according to an embodiment of the present disclosure.
Figure 9:
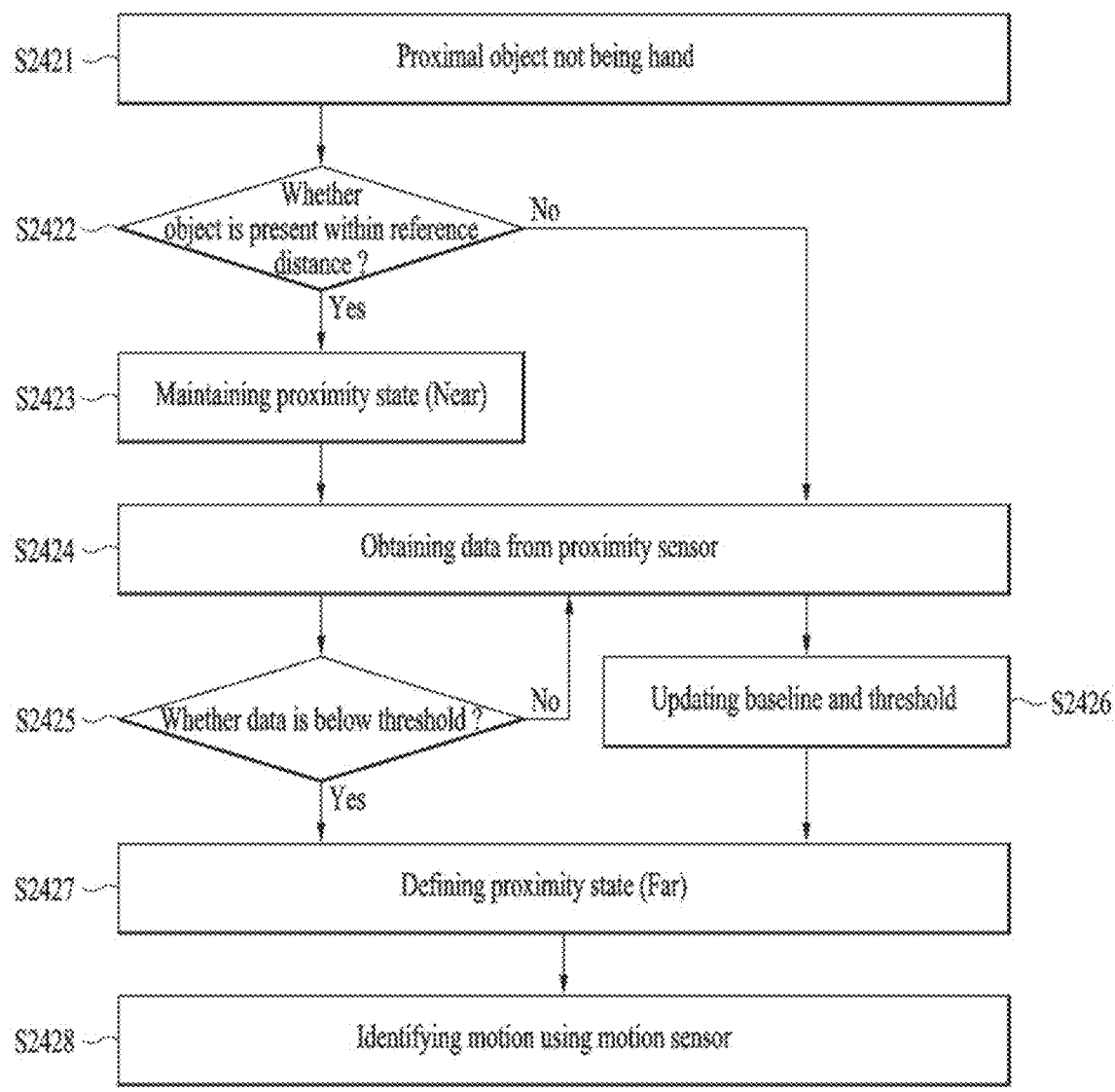
Figure 10:
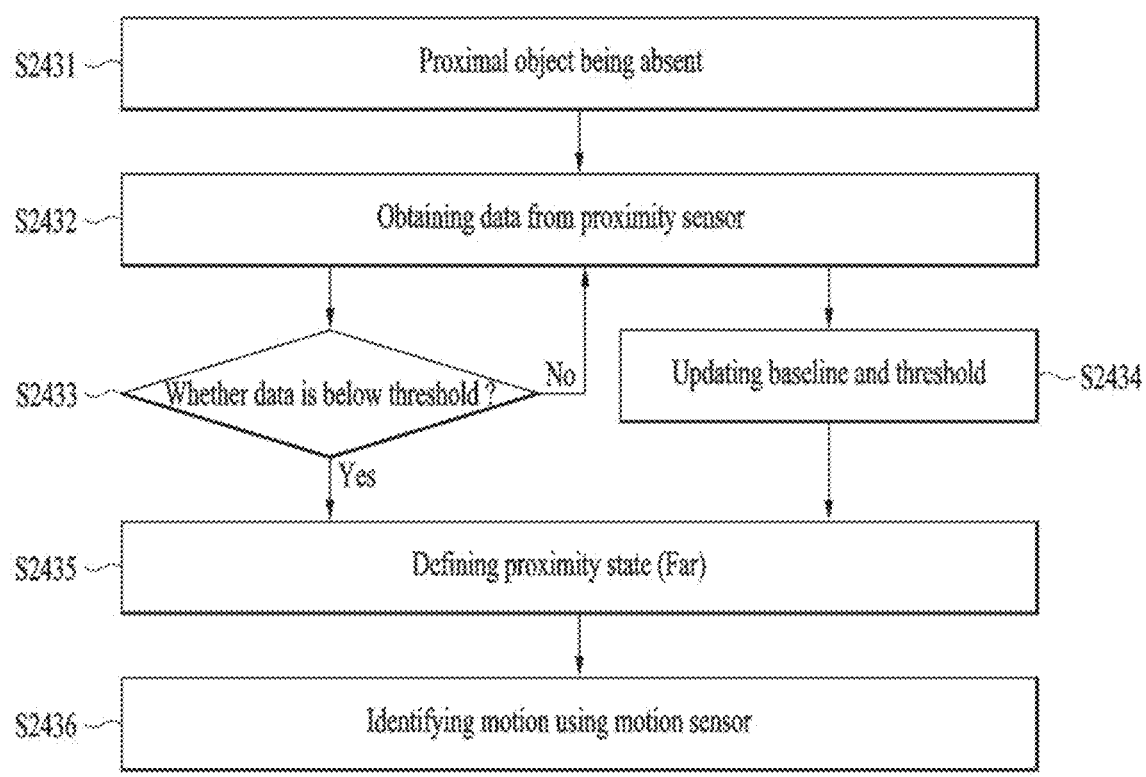

FIG. 8 to FIG. 10 are flowcharts illustrating a process for updating a threshold value of a proximity sensor based on the presence or absence of an object or a type of the object according to an embodiment of the present disclosure. Hereinafter, FIG. 8 to FIG. 10 will be described based on FIG. 2.

Specifically, FIG. 8 is a flow chart when a proximal object corresponds to the user's hand. FIG. 9 is a flow chart when a proximal object corresponds to an object other than the user's hand. FIG. 10 is a flow chart when a proximal object is absent.

When the proximal object is identified as the user's hand, the proximity sensor 200 activates the depth camera 300 and does not reset the baseline of the proximity sensor 200 separately. Specifically, referring to FIG. 8, when a proximal object is identified as the user's hand S2411, the object identifying module 610 passes the identification result to the proximity trigger 520. Then, the proximity trigger 520 acquires proximity data using the proximity sensor 300 S2412.

The data obtained using the proximity sensor 300 is compared with the previously set threshold S2413. When the former is smaller than the latter, the object can be determined to be far away from the device S2145. Thus, the processor can use the motion sensor 300 to identify the motion S2415.

In this connection, the depth camera 300 can operate in an active mode and can track the index finger of the user hand. However, when the proximal object is an object other than the user's hand, the depth camera 200 does not operate in the active mode. Based on the acquired depth image, the processor can reset the baseline of the proximity sensor 300.

Specifically, in FIG. 9, when the proximal object is identified as an object other than the user's hand S2421, the object identifying module 610 determines whether the object exists below the predefined distance S2422, and transmits the determination S2422 to the proximity trigger 520.

The proximity trigger 520 does not reset the baseline of the proximity sensor when the object is present within the predefined distance (S2422, Yes). In other words, the processor maintains the determination that the object is in the proximal state at S2423, and, then, compares the data obtained using the proximity sensor at S2424 with the existing threshold value at S2425 and then continues to obtain the data S2424 or stops the data acquisition using the proximity sensor S2427, based on the comparison result. In S2427, the proximity state=Far. In S2427, the processor can use the motion sensor to verify motion S2428.

However, when the object is present beyond the predefined distance, the proximity trigger 520 can update the baseline and threshold value based on the data obtained using the proximity sensor 300 at S2424 (S2426). In other words, the proximal state is redefined based on the updated threshold value S2427. Thus, the processor can stop acquiring data using the proximity sensor and can use the motion sensor to verify motion S2428.

When no proximal object exists, this indicates that the proximity sensor 300 incorrectly activates the depth camera. Thus, the processor needs to reset the baseline of the proximity sensor 300. Specifically, as shown in FIG. 10, when the depth image is used to identify the absence of the proximal object S2431, the object identifying module 610 passes the identification result to the proximity trigger 520 and acquires the data again using the proximity sensor 2431 S2432

When the re-acquired data is smaller than the existing threshold (S2433 Yes), it may be determined that the existing threshold value is correct, but the depth camera is incorrectly active due to other factors. Then, the processor can re-define a state of the object as a state in which the object is at remote location and can proceed with a step S2436 in which the processor use the motion sensor to verify motion.

However, when the re-acquired data is greater than the existing threshold (S2433, Yes), this indicates that the existing threshold value is not correct. Thus, the baseline and threshold value can be reset using the re-acquired data S2434. The proximal state is redefined based on the updated threshold value S2435. Thus, the processor can stop acquiring the data using the proximity sensor and can proceed with a step S2436 in which the processor use the motion sensor to verify motion.

Figure 11:
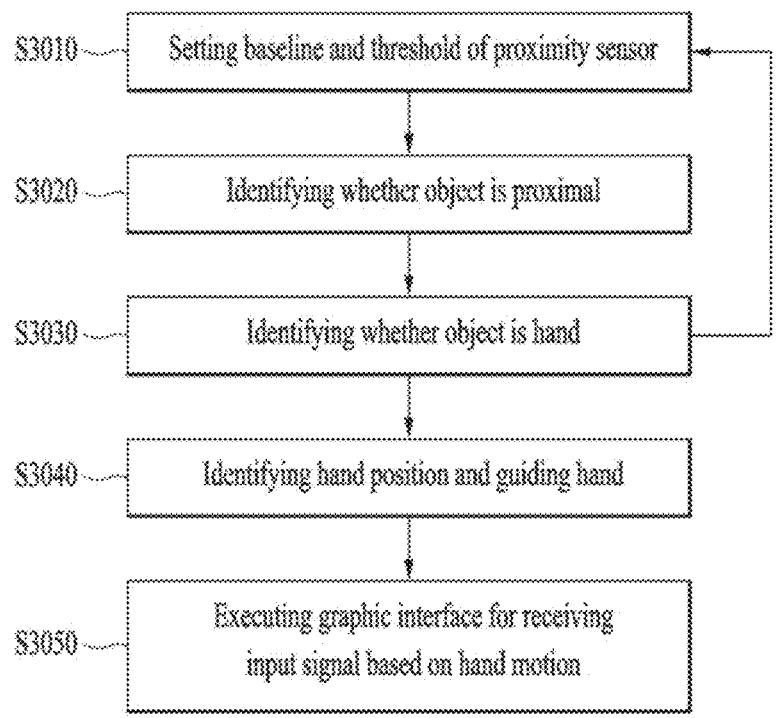
FIG. 11 is a flowchart illustrating a process of providing a guide interface such that a specific object is positioned in an interaction region of an imaging region of a TOF camera according to one embodiment of the present disclosure.

FIG. 11 is a flowchart illustrating a process of providing a guide interface for positioning a specific object into an interaction region of an imaging region of a TOF camera according to an embodiment of the present disclosure. The device in accordance with the present disclosure includes a display that provides visual content, a TOF (Time of Flight) camera that captures an object and obtains a depth image, and a controller connected to the display and the TOF camera. The controller can control the display to provide a guide interface that guides a specific object to be positioned in an interaction region of the TOF camera's imaging region.

In this connection, the specific object may correspond to the user's hand. When the user's hand is positioned in the interaction region under guidance of the guide interface, the device in accordance with the present disclosure includes a graphical interface for receiving an input signal based on the user's hand motion. The process is illustrated in detail using FIG. 11.

According to the present disclosure, the TOF camera is an electronic component that consumes a lot of power. Thus, it may not be suitable for the TOF camera to operate in an active state at all times in terms of energy efficiency. Thus, the device in accordance with the present disclosure may use a proximity sensor to switch the TOF camera from an inactive state to an active state.

The proximity sensor according to the present disclosure is a sensor that detects whether an object is proximal to or far from the device, based on the amount of reflection of the irradiation light. Specifically, the proximity sensor according to the present disclosure sets the baseline of the detected light amount and adds a predefined light amount value to the baseline to define a threshold that is used to distinguish whether an object is proximal to or far from the device S3010. The process of setting the baseline and defining the threshold by the proximity sensor according to the present disclosure is described in details with reference to FIG. 5 to FIG. 10.

The device in accordance with the present disclosure uses the proximity sensor to determine whether an object is proximal thereto S3020. When the object is proximal thereto, the device can switch the TOF camera to an active state to obtain the depth image therefrom.

In accordance with the present disclosure, when an object is proximal to the device, the processor can acquire a depth image using the TOF camera switched to the active state. Then, the processor can identify whether the proximal object corresponds to a specific object based on the depth image. In this connection, the specific object may correspond to the user's hand S3030. The processor in accordance with the present disclosure can reset the baseline of the proximity sensor, depending on whether the specific object corresponds to the user's hand, or is an object that does not correspond to the user's hand, or whether the TOF camera has been incorrectly switched to the active state. This is described in detail using FIG. 5 to FIG. 10.

The device in accordance with the present disclosure may include a guide interface for identifying the position of the user hand in the depth image obtained using the TOF camera and for guiding the user's hand to a specific position S3040. The present disclosure provides a graphical interface for receiving an input signal based on the motion of the user's hand when the guide interface guides the hand of the user to be positioned at a specific position S3050.

Figure 12:
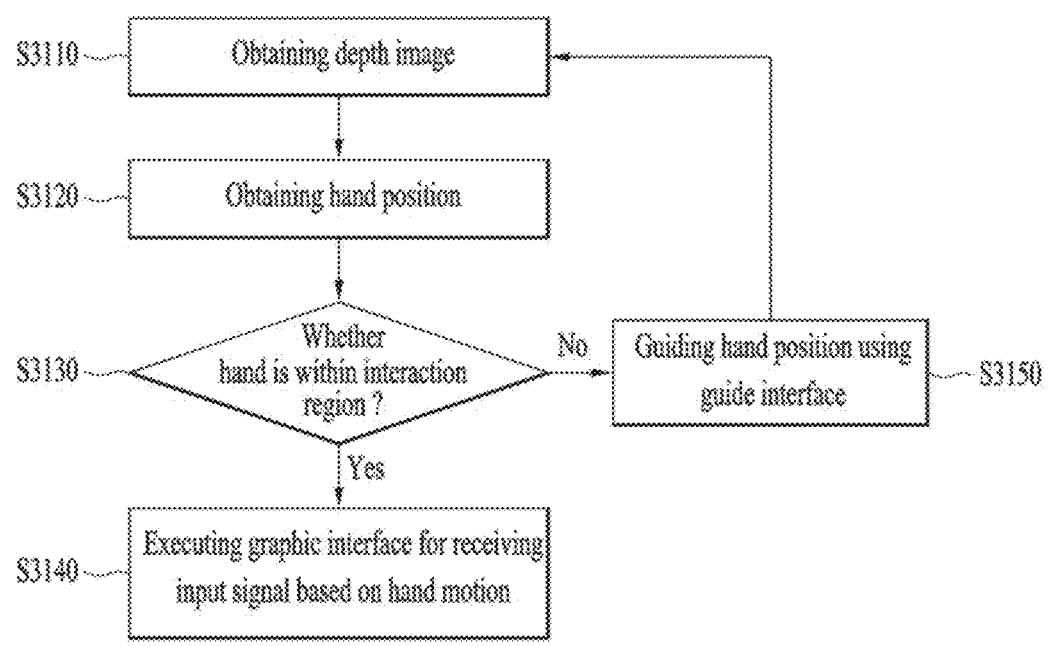
FIG. 12 is a flowchart illustrating a process of guiding a specific object to a specific position according to one embodiment of the present disclosure.

Hereinafter, a process for guiding the user's hand to a specific position will be described in detail. In particular, FIG. 12 is a flowchart illustrating a process of guiding a specific object to a specific position according to an embodiment of the present disclosure.

The TOF camera according to the present disclosure can maintain an active state and acquire a depth image when the proximal object corresponds to the user's hand S3110. The device in accordance with the present disclosure can determine the position of the user's hand based on the acquired depth image S3120. In this connection, the position of the user's hand may be identified using contour coordinates of the user hand or using representative coordinates (ex, center coordinates) representing the position of the user hand. Further, the identified position of the user hand may include the position on the plane facing the TOF camera and distance information away from the TOF camera.

The device in accordance with the present disclosure can identify whether the identified position of the hand of the user is within the interaction region S3130. In this connection, the interaction region refers to a region within the imaging region of the TOF camera, and may be a region in which the finger tracking using the TOF camera is easy. The interaction region is described in detail using FIG. 13 below.

When the position of the user's hand is within the interaction region (S3130, Yes), the processor can execute a graphic application that receives input signals based on the motion of the user hand S3140. In some cases, the device in accordance with the present disclosure can execute the graphic application when the position of the user's hand is positioned in the interaction region for a predefined time duration.

The device in accordance with the present disclosure may use the guide interface to guide the hand position when the position of the user's hand is out of the interaction region, or is positioned on a boundary of the interaction region (S3130, No). In some cases, the guide interface may inform the user that the position of the user's hand is within the interaction region.

FIG. 13 illustrates an interaction region according to an embodiment of the present disclosure. The mobile terminal 710 according to the present disclosure includes a TOF camera 720 on one side thereof. A depth image can be obtained within a FOV (Field of View) 721 of the TOF camera 720.

The device in accordance with the present disclosure can define a specific region in the imaging region of the TOF camera 720 as an interaction regions 722 and 723. Each of the interaction regions 722 and 723 can typically correspond to a region where the user's hand is positioned when the user wishes to provide an input signal using the motion of the hand. Alternatively, each of the interaction regions 722 and 723 can be a region in which depth information of the object can be accurately analyzed.

In more detail, the interaction regions 722 and 723 according to the present disclosure may be positioned in a first distance range from the TOF camera 420. In this connection, the first distance range may be positioned within a predefined distance range along a Z axis of the TOF camera 720.

Further, the interaction regions 722 and 723 according to the present disclosure may be positioned within a specific FOV range within a total FOV range of the TOF camera 420. Further, each of the interaction region 723 according to the present disclosure may be a region positioned within a specific coordinate range on a plane (e.g., xy plane) facing the TOF camera 720. For example, when the TOF camera is positioned at a center of the xy plane, the interaction region 723 may be positioned within the predefined radius from the center. Alternatively, the interaction region 723 may be a region included in a coordinate range as defined by (x1, y1), (x2, y2), (x3, y3) and (x4, y4).

Figure 14:
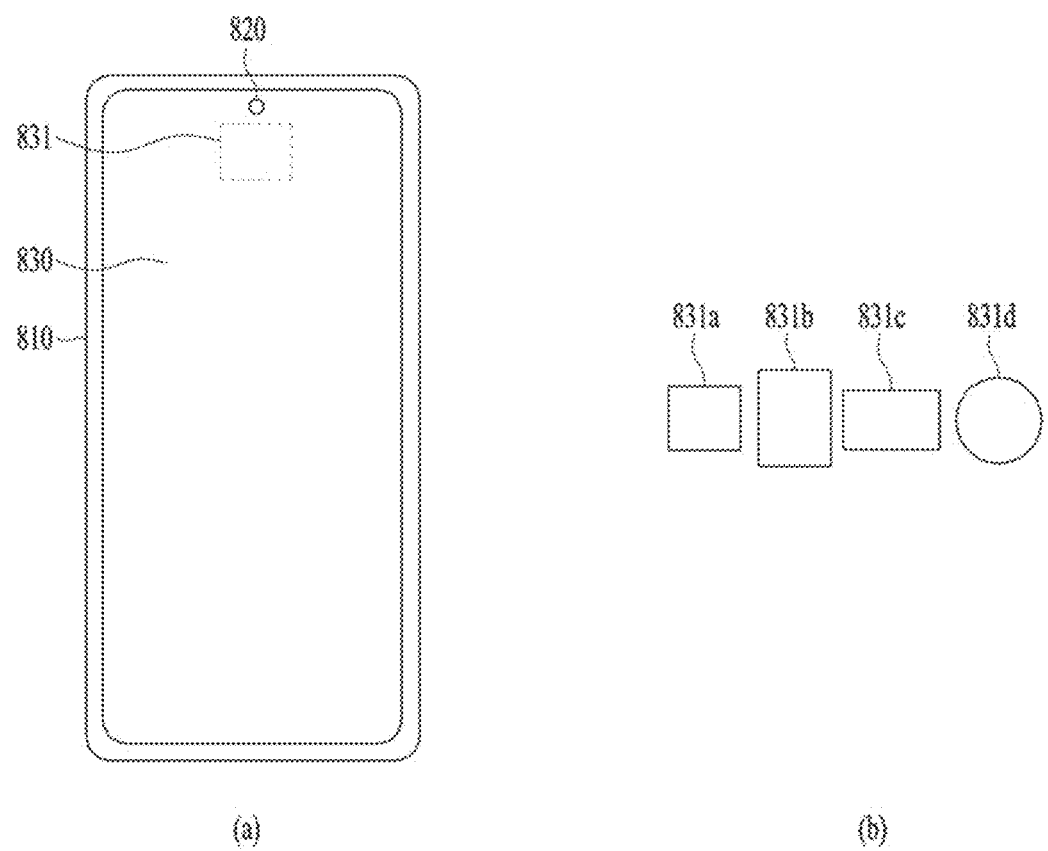
FIG. 14 is a diagram illustrating a preview window providing a guide interface according to an embodiment of the present disclosure.

FIG. 14 illustrates a preview window providing a guide interface according to an embodiment of the present disclosure. The mobile terminal 810 according to the present disclosure includes a TOF camera 820 on one side thereof and may include a display 830 on the same side as the TOF camera 820.

The display 830 according to the present disclosure may include a preview window 831 that provides a guide interface to guide the user's hand. The preview window 831 may occupy at least a portion of the region occupied by the display 830 as shown in FIG. 14(a). Further, as shown in FIG. 14(b), preview windows 831a to 831d may have shapes corresponding to shapes of the interaction regions 822 and 823 described in FIG. 13.

Figure 15:
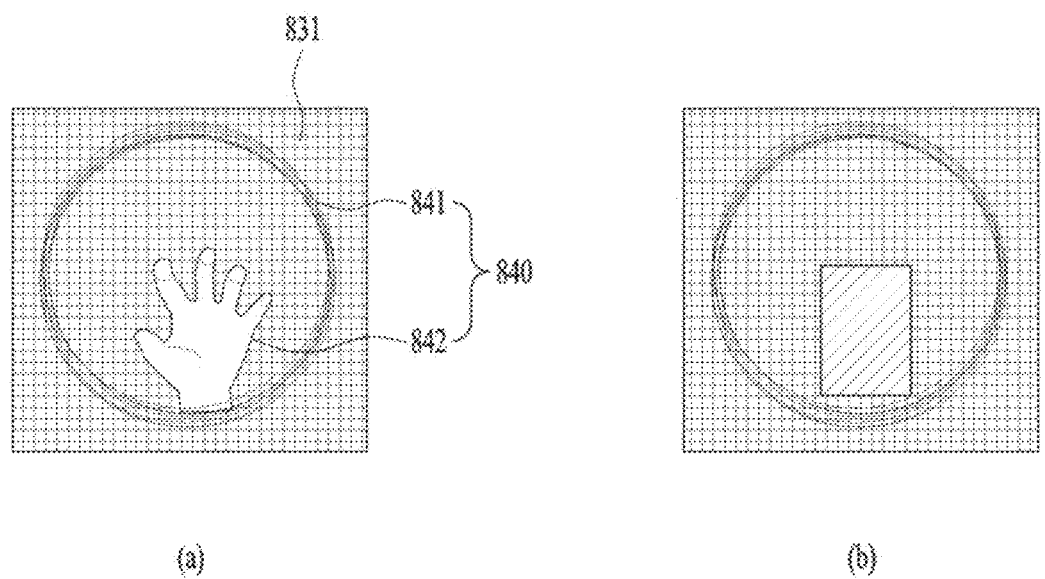
FIG. 15 illustrates a guide interface displayed on a preview window according to an embodiment of the present disclosure.

FIG. 15 illustrates a guide interface displayed in a preview window according to an embodiment of the present disclosure. The device in accordance with the present disclosure may provide a guide interface 840 to guide the position of the user hand to the preview window 831.

The guide interface 840 according to the present disclosure may include a first indicator 841 corresponding to the interaction region of FIG. 13 and a second indicator 842 moving in response to the motion of a specific object. The second indicator 842 according to the present disclosure may be configured in a size that the second indicator may be included in a region defined by the first indicator 841.

The second indicator 842 according to the present disclosure may be configured into a shape representing a shape of a specific object. Specifically, FIG. 15(a) illustrates an embodiment that provides a second indicator 842 having a shape corresponding to the shape of the user's hand. In this instance, the second indicator 842 can move in a corresponding manner to a motion of the user hand on the coordinates. The shape of the second indicator 842 can vary depending on the shape of the user hand.

The second indicator 842 according to the present disclosure may be configured into a shape that is independent of the shape of the specific object. Specifically, FIG. 15(b) illustrates an embodiment that provides the second indicator 842 with a rectangular shape that is independent of the shape of the user's hand.

In accordance with the present disclosure, the first indicator 841 may be fixed, while the second indicator 842 can be moved or have a variable size. The device in accordance with the present disclosure can guide the user's hand based on the motion or size change of the second indicator 842 relative to the first indicator 841. The guide interface 840 according to the present disclosure can provide graphic feedback to guide the user's hand more easily. Hereinafter, an embodiment of the graphic feedback provided by the guide interface 840 will be described.

Figure 16:
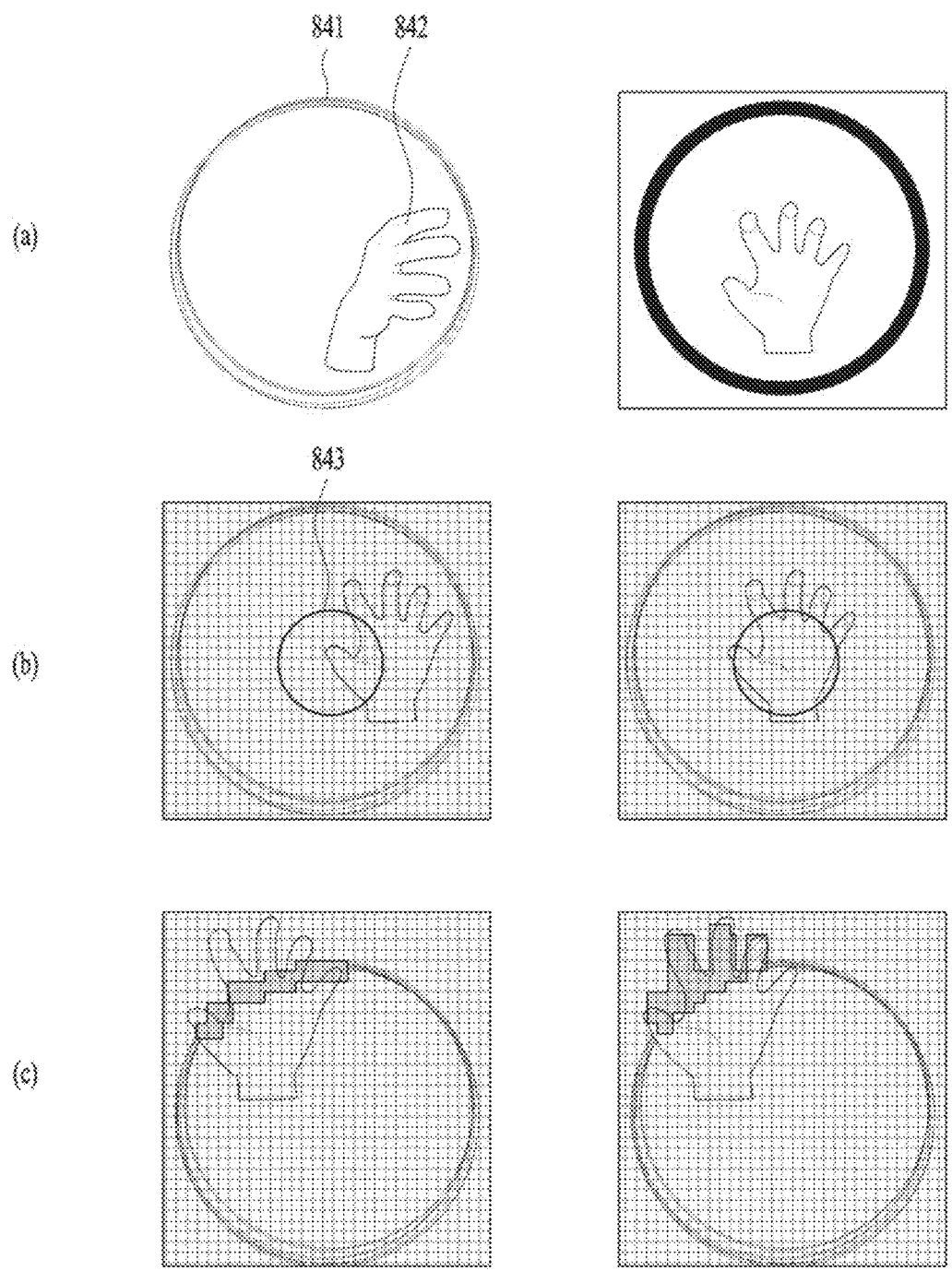
FIG. 16 illustrates a graphical feedback that guides the user's hand not to leave an interaction region on a plane facing a TOF camera, according to one embodiment of the present disclosure.

FIG. 16 is a diagram illustrating a graphical feedback that guides the user's hand not to leave the interaction region on the plane facing the TOF camera, according to one embodiment of the present disclosure. A guide interface 840 according to the present disclosure can provide graphic feedback that guides the user's hand not to leave the interaction region on the plane facing the TOF camera.

The guide interface 840 according to the present disclosure can provide the graphic feedback when the second indicator 842 is positioned in a central region of the first indicator 841. FIG. 16(a) shows a graphic feedback embodiment in which a color of the first indicator 841 changes when the second indicator 842 is positioned in a central region of the first indicator 841. In some cases, the present disclosure can provide a graphic feedback embodiment in which a color of the second indicator 842 changes when the second indicator 842 is positioned in a central region of the first indicator 841.

The guide interface 840 according to the present disclosure includes a third indicator 843 surrounding the central region of the first indicator 841. In response to the motion of the second indicator 842, a graphic feedback indicating a portion overlapping with the third indicator 843 can be provided. FIG. 16(b) shows a graphic feedback indicating a region where the second indicator 842 overlaps the third indicator 843 in response to the motion of the second indicator 842. The guide interface 750 can guide the second indicator 843 to fully overlap the third indicator 843 to guide the user hand.

The guide interface 840 according to the present disclosure may provide graphic feedback indicating that the second indicator 842 deviates from the first indicator 841. Specifically, a first case of FIG. 16(c) illustrates an embodiment in which graphic feedback is provided to indicate a boundary portion where the second indicator 842 overlaps the first indicator 841. The user can determine a direction in which the hand should move with reference to the portion where the second indicator 841 overlaps the first indicator 841. Further, a second case of FIG. 16(c) illustrates an embodiment that provides graphic feedback to indicate a portion of the second indicator 842 that deviates from the first indicator 841. The user may refer to a position and a size of the portion to determine the direction and amount of hand movement.

Figure 17:
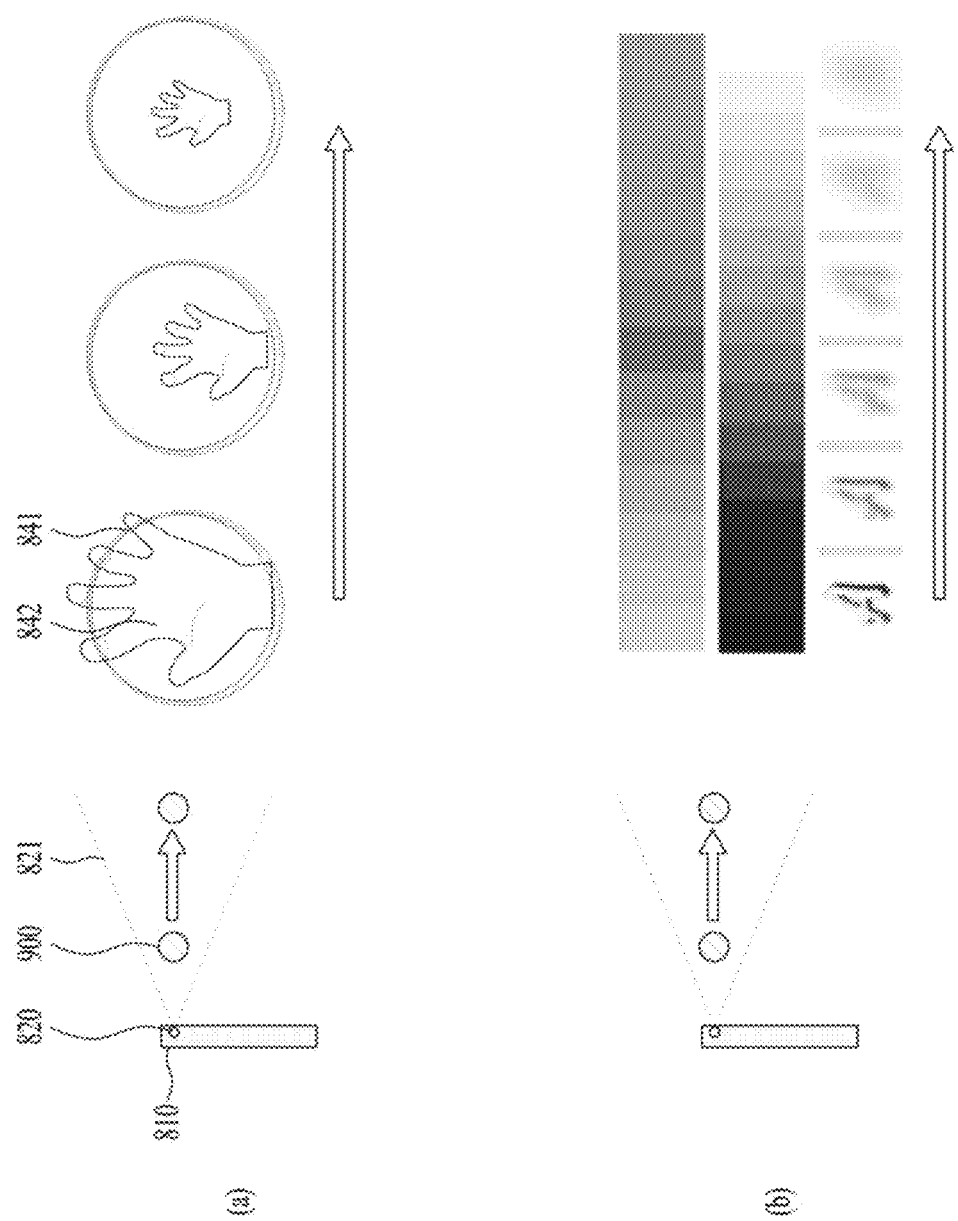
FIG. 17 and FIG. 18 illustrate a graphical feedback that guides the user's hand not to leave an interaction region based on a distance to the TOF camera, according to one embodiment of the present disclosure.
Figure 18:
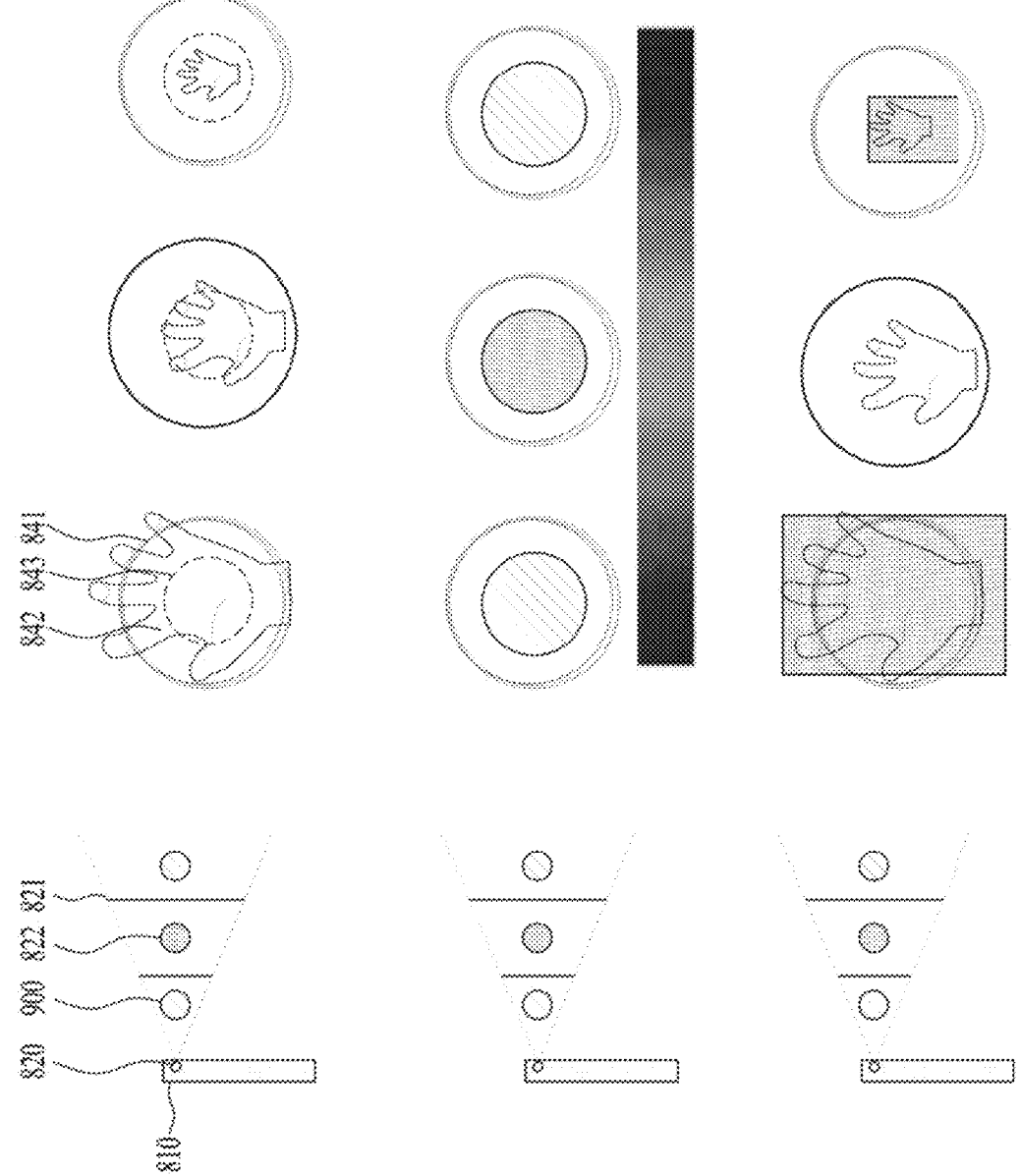

FIG. 17 and FIG. 18 illustrate graphic feedback for guiding the user's hand not to leave the interaction region based on a distance to the TOF camera according to an embodiment of the present disclosure. The mobile terminal 810 according to the present disclosure can change the size of the second indicator 842 based on the distance between the user's hand 900 and the TOF camera 820 within the FOV 842 of the TOF camera 820. Specifically, the terminal in accordance with the present disclosure can provide a smaller size of the second indicator 842 as the user's hand 900 moves away from the TOF camera 820, as shown in FIG. 17(a). In this connection, the size of the second indicator 842 can be determined relative to the size of the first indicator 841 based on the distance from the TOF camera 820.

The terminal in accordance with the present disclosure may include a fourth indicator 843 surrounding the central region of the first indicator as shown in FIG. 18(a). An appropriate distance between the user hand 900 and the TOF camera 820 can be recognized by comparing the size of the fourth indicator 843 of the user and a size of the second indicator 842 with each other. In some cases, when the second indicator 842 has a size than the second indicator is present between the first indicator 841 and the fourth indicator 843, the graphic feedback may be provided to indicate that the hand is positioned at an appropriate distance.

According to the present disclosure, the mobile terminal 810 can vary the color, contrast, and sharpness of the guide interface based on the distance between the user's hand 900 and the TOF camera 820, as shown in FIG. 17(b). In more detail, FIG. 18(b) illustrates an embodiment in which the contrast of the second indicator 842 is changed based on the distance between the user's hand 900 and the TOF camera 820. FIG. 18(c) shows an embodiment where the sharpness of the second indicator 842 varies based on the distance between the user's hand 900 and the TOF camera 820. The second indicator 842 can vary in saturation, contrast, and sharpness thereof depending on the distance between the user's hand 900 and the TOF camera 820 while the size of the second indicator relative to the size of the first indicator 842 varies based on the distance.

FIG. 19 is a diagram illustrating explaining a graphic interface provided when the user's hand is positioned in the interaction region according to an embodiment of the present disclosure. In accordance with the present disclosure, when the hand of the user is positioned in the interaction region under guidance of the guide interface, the display 830 can be used to provide a graphic interface 850.

In accordance with the present disclosure, when the graphical interface 850 is provided, the input signal can be received based on the user's hand motion according to the provided graphic interface 850. The graphic interface 850 according to the present disclosure can provide an application 852 executable based on the motion direction of the user's hand as shown in FIG. 19(a). In this connection, the graphic interface 850 can provide a graphic feedback 851 indicating the position of the user hand.

The graphical interface 850 according to the present disclosure can provide an application 852 executable based on the user's hand shape as shown in FIG. 19(b). For example, when the user hand fingers are unfolded, the graphic interface 850 provides first and second applications on the left and right sides respectively. The mobile terminal according to the present disclosure can execute the first application or the second application based on the motion direction of the user's hand. Further, when the user hand fingers are folded, the graphic interface 850 provides third and fourth applications on the left and right sides respectively. The mobile terminal according to the present disclosure can execute the third application or fourth application depending on the motion direction of the user hand.

The graphic interface 850 according to the present disclosure may be an interface that provides a volume control function in response to the rotation of the user's hand as shown in FIG. 19(b). In some cases, the graphic interface 850 may be an interface that provides a function of fast forwarding, screen brightness control, or moving to next content in response to the rotation of the user's hand.

The above detailed description should not be construed as limiting in all respects, but should be considered as illustrative. The scope of the present disclosure should be determined by reasonable interpretation of the appended claims. All changes within the equivalence range according to the present disclosure are included in a range under the present disclosure.

What is claimed is:

1. A mobile terminal comprising:
   a display;
   a Time of Flight (TOF) camera configured to obtain a depth image of an object; and
   a controller configured to:
   in response to identifying the object corresponds to a user's hand, display a square-shaped guide interface on the display at a position below the TOF camera in which a center axis of the TOF camera corresponds with a center axis of the displayed square-shaped guide interface;
   in response to identify the object does not correspond to the user's hand, deactivate the TOF camera and not display the guide interface on the display,
   wherein the guide interface includes:
   a first indicator comprising a displayed circle contained and remaining fixed within the square-shaped guide interface and configured to indicate an imaging region of the TOF camera; and
   a second indicator comprising a graphical hand, and
   wherein the controller is further configured to:
   move graphical hand within the displayed circle to guide the user to move their hand to the center of the imaging region of the TOF camera corresponding to a center of the displayed circle, and
   change a size of the displayed graphical hand to enlarge as the user moves their hand toward the TOF camera and reduce as the user moves their hand away from the TOF camera.

2. The mobile terminal of claim 1, wherein the controller is further configured to:
   provide a first graphic feedback by altering a color of the displayed circle when the graphical hand is positioned at the center of the displayed circle.

3. The mobile terminal of claim 2, wherein the controller is further configured to:
   display a third indicator surrounding the center of the displayed circle, and
   provide a second graphic feedback by highlighting an overlapping portion between the graphical hand and the third indicator.

4. The mobile terminal of claim 3, wherein the controller is further configured to:
   provide a third graphic feedback by highlighting a boundary portion of the displayed circle overlapping the graphical hand.

5. The mobile terminal of claim 4, wherein the is further configured to:
   provide a fourth graphic feedback by highlighting a portion of the graphical hand outside of the displayed circle.

6. The mobile terminal of claim 1, wherein the displayed circle has a fixed size.

7. The mobile terminal of claim 5, wherein the controller is further configured to:
   provide a fifth graphic feedback indicating that the user's hand is located at a predetermined reference distance from the TOF camera when the graphical hand has a size which is greater than the third indicator and is smaller than the displayed circle.

8. The mobile terminal of claim 7, wherein the controller is further configured to:
   provide a sixth graphic feedback by altering a color, contrast, or sharpness of the graphical hand based on the size of the graphical hand relative to the size of the displayed circle.

9. The mobile terminal of claim 1, wherein the graphic interface contains an application executable based on a motion direction of the object.

10. The mobile terminal of claim 1, wherein the controller is configured to:
    provide volume control, fast forward, screen brightness control, or moving to next content based on a rotation amount of the object.

11. The mobile terminal of claim 1, further comprising:
    a proximity sensor configured to detect a proximity of the object to the mobile terminal,
    wherein the controller is further configured to activate the TOF camera only when the proximity sensor detects the object is in proximity to the mobile terminal.

12. The mobile terminal of claim 1, wherein the controller is further configured to display the guide interface in a preview window which is isolated from other interfaces on the display.

13. The mobile terminal of claim 11, further comprising:
    a motion sensor configured to detect the motion of the object,
    wherein the controller is further configured to activate the proximity sensor only when the motion sensor detects that the object is stationary.

* * * * *